United States Patent [19]

Brunner et al.

[11] 4,035,571
[45] July 12, 1977

[54] FIRE RETARDANT COPOLYMERS

[75] Inventors: Robert H. Brunner, Yonkers; Paul Kraft, Spring Valley, both of N.Y.

[73] Assignee: Stauffer Chemical Company, Westport, Conn.

[21] Appl. No.: 616,453

[22] Filed: Sept. 24, 1975

Related U.S. Application Data

[63] Continuation of Ser. No. 477,874, June 10, 1974, abandoned.

[51] Int. Cl.$^2$ .............. C08F 220/12; C08F 220/68; C08F 230/02
[52] U.S. Cl. ................. 526/275; 260/DIG. 24; 260/29.6 TA; 260/45.7 P; 260/17.4 R; 260/857 G; 260/859 R; 260/862; 260/874; 260/887; 260/897 B; 260/898; 260/899; 260/901; 428/500; 428/522; 428/921; 526/271; 526/278
[58] Field of Search ................ 260/80.71; 526/275, 526/278

[56] References Cited

U.S. PATENT DOCUMENTS

| | | | |
|---|---|---|---|
| 2,888,434 | 5/1959 | Shashoua | 260/45.5 |
| 3,489,706 | 1/1970 | Mikofalvy | 260/29.6 |
| 3,682,871 | 8/1972 | Mikofalvy et al. | 260/80.71 |
| 3,684,779 | 8/1972 | Rapko | 260/78.5 P |
| 3,691,127 | 9/1972 | Kraft | 260/29.6 T |
| 3,725,509 | 4/1973 | Kraft et al. | 260/899 |
| 3,726,839 | 4/1973 | Jin | 260/78.5 CL |
| 3,792,113 | 2/1974 | Goswami et al. | 260/857 UN |
| 3,824,222 | 7/1974 | Shichioo et al. | 260/80.71 |
| 3,842,048 | 10/1974 | Jin | 260/78.5 BB |

*Primary Examiner*—Stanford M. Levin
*Attorney, Agent, or Firm*—Richard P. Fennelly

[57] ABSTRACT

Fire retardant copolymers of: (1) a bis (hydrocarbyl) vinylphosphonate, (2) a monomer which contains one ethylenically unsaturated bond, and (3) acrylic or methacrylic acid are disclosed. These copolymers are useful in a variety of applications, including as coatings, and as additives for enhancing the fire retardancy of thermoplastics.

11 Claims, No Drawings

FIRE RETARDANT COPOLYMERS

This is a continuation of application Ser. No. 477,874 filed June 10, 1974, now abandoned.

TECHNICAL DISCLOSURE OF THE INVENTION

Prior art attempts to form copolymers of various bis (hydrocarbyl) vinylphosphonate, such as bis (beta-chloroethyl) vinylphosphonate, with monomers containing ethylenic unsaturation, e.g. vinyl chloride, methyl methacrylate, and the like, have not produced products which were substantially free of unreacted vinylphosphonate. Two examples of such prior art processes are described in U.S. Pat. No. 3,726,839 to Jung Il Jin and U.S. Pat. No. 3,691,127 to Paul Kraft et al.

The present invention relates to a copolymer of such a vinylphosphonate with an ethylenically unsaturated monomer and either acrylic or methacrylic acid. This novel copolymer contains higher levels of polymerized vinylphosphonate than found in copolymers known to the prior art. The amount of vinylphosphonate varies between about 5–85% by weight of the final composition, the weight of ethylenically unsaturated monomer varies between about 10–85% by weight and the amount of either acrylic or methacrylic acid varies between about 2–50%. Preferred amounts are about 20–75% vinylphosphonate, about 20–60% ethylenically unsaturated monomer and about 5–40% acrylic or methacrylic acid. Particularly preferred weight amounts for these components are about 35–50%, about 35–50% and about 5–20% by weight, respectively. When amounts of acrylic or methacrylic acid in the final product are in the range of from about 15–40% by weight, the final product contains sufficient pendant carboxyl groups to render it water soluble when neutralized. This allows the copolymer to be solubilized in water for coating applications.

The type of bis (hydrocarbyl) vinylphosphonate intended to be used in forming the copolymer of the present invention has the structure:

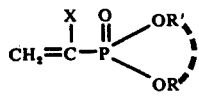

wherein X is selected from the group consisting of hydrogen, halogen, cyano, aryl, such as phenyl, $C_1$–$C_{18}$ alkyl and

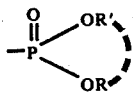

wherein R and R' are hydrocarbyl and substituted hydrocarbyl groups consisting essentially of hydrogen and carbon and containing up to about 18 carbon atoms inclusive with the proviso that R and R' may be the same, different or conjoint, i.e., R and R' may form one single radical.

The use, in this disclosure, of the expression, "hydrocarbyl" and "substituted hydrocarbyl" groups refers to the radicals obtained upon the removal of a hydrogen from a hydrocarbon or substituted hydrocarbon group which may be either an aliphatic or aromatic group. These hydrocarbyl groups may be substituted with any non-interfering groups, i.e, with any group which does not interfere with the polymerization of the bis-(hydrocarbyl) vinylphosphonate. Such substituent groups include, for example, chloro, bromo, fluoro, nitro, hydroxy, sulfone, ethoxy, methoxy, nitrile, ether, ester and keto groups and the like.

Illustrative of such groups as are represented by R and R' are alkyl or alkenyl groups, such as methyl, ethyl, propyl, butyl, pentyl, hexyl, nonyl, pentenyl, and hexenyl groups and all of their respective isomers; cycloalkyl or cycloalkenyl groups, such as cyclopropyl, cyclobutyl, cyclopentyl, cyclohexyl and cyclohexenyl groups and the like; while typical aryl groups represented by R and R' include phenyl, benzyl, phenethyl, tolyl and naphthyl groups and the like.

Representative of the above depicted bis (hydrocarbyl) vinyl phosphonates which may be used in preparing the fire retardant vinyl chloride copolymer latices of this invention are:

Bis(beta-chloroethyl) vinylphosphonate;
Bis(beta-chloropropyl) vinylphosphonate;
Bis(beta-chloroethyl) 1-methylvinylphosphonate;
Bis(beta-chloroethyl) 1-cyanovinylphosphonate;
Bis(beta-chloroethyl) 1-chlorovinylphosphonate;
Bis(beta-chloroethyl) 1-phenylvinylphosphonate;
Dimethyl vinylphosphonate;
Diethyl vinylphosphonate;
Bis(omega-chlorobutyl) vinylphosphonate;
Di-n-butyl vinylphosphonate;
Di-isobutyl vinylphosphonate;
Bis(2-chloroisopropyl) 1-methylvinylphosphonate;
Diphenyl vinylphosphonate; and
Bis(2,3-dibromopropyl) vinylphosphonate.

It is, however, to be emphasized that it is preferred to employ bis(beta-chloroethyl) vinylphosphonate in preparing the copolymer latices of this invention since the latter monomer is a commercially available material and lower in cost than any of the other above listed bis(hydrocarbyl) vinylphosphonates.

The types of monomers that contain one ethylenically unsaturated bond, i.e., vinyl compounds which copolymerize with the bis(hydrocarbyl) vinylphosphonate, form the second component of the copolymer of the present invention. Included with this class are: the vinyl halides such as vinyl chloride, vinyl bromide, vinyl fluoride and trifluoroethylene; vinylidene halides such as vinylidene chloride, vinylidene bromide and vinylidene fluoride; alpha-olefins such as ethylene, propylene and butylene; vinyl esters of carboxylic acids such as vinyl acetate, vinyl butyrate, and vinyl stearate; the $C_1$–$C_{20}$ alkyl esters of acrylic and methacrylic acid such as methyl methacrylate, methyl acrylate, ethyl acrylate, butyl acrylate, 2-ethylhexyl acrylate and lauryl acrylate; aryl, halo- and nitro- substituted benzyl esters of acrylic and methacrylic acid such as benzyl acrylate and 2-chlorobenzyl acrylate; ethylenically unsaturated dicarboxylic acids, their anhydrides and their $C_1$–$C_{20}$ mono- and dialkyl esters such as aconitic acid, fumaric acid, maleic acid, itaconic acid, citraconic acid, maleic anhydride, dibutyl fumarate and monoethyl maleate; amides of ethylenically unsaturated carboxylic acids such as acrylamide and methacrylamide; vinyl aryl compounds such as styrene and alpha-methyl styrene; nitriles of ethylenically unsaturated carboxylic acids such as acrylonitrile and methacrylonitrile; and, $C_1$–$C_{20}$ alkyl vinyl ethers such as methyl vinyl ether, ethyl vinyl ether and stearyl vinyl ether. Preferred for use as optional comonomers are the vinyl halides particularly vinyl chloride; and vinylidene halides, particularly vinylidene chloride; the vinyl aryl compounds particularly styrene and the lower alkyl esters of acrylic and methacrylic acids.

The copolymer latices of this invention may be prepared by means of free radical initiated emulsion polymerization processes well known to those skilled in the art. In these procedures, the various monomers and catalysts are emulsified, in water, by means of one or more surface-active emulsifiers whereupon the polymerization reaction is then initiated.

Suitable water soluble, free radical initiating catalysts for use in preparing the copolymer latices of this invention include sodium, potassium and ammonium persulfate and hydrogen peroxide or one may use a redox system such, for example, as a mixture of a persulfate with an alkali metal bisulfite, thiosulfate or hydrosulfite. These catalysts should be present in a concentration of from 0.1 to 5% by weight, of the total monomer charge. With respect to the emulsifier or surfactant, it is possible to utilize one or more anionic, cationic, or non-ionic emulsifiers such, for example, as the alkyl carboxylic acid salts; the alkyl sulfate, sulfonate, phosphate, or sulfosuccinate salts; the alkyl aryl ether alcohols, and the alkyl aryl polyether sulfate salts. The selected emulsifier or emulsifiers should be present in a total concentration of from about 0.3 to 8%, by weight, of the total monomer charge. In addition, a protective colloid such as polyvinyl alcohol, methyl cellulose or gelatin can also, if desired, be present in the recipe in a concentration of from about 0.05 to 5%, by weight, of the total monomer charge.

The actual polymerization reaction will ordinarily be conducted at a temperature of from about 30° to 80° C. for a period of from about 6 to 24 hours, depending upon such factors as the particular monomer, catalysts, surfactants and polymerization apparatus that is being utilized. The latices resulting from this polymerization process will ordinarily have a resin solids content of from about 20 to 50%, by weight, wherein the particles range in size from about 0.02 to 2 microns.

It should also be noted that, if desired, the copolymers of this invention can alternatively be prepared in the form of aqueous suspensions which contain from 0.01 to 5%, as based upon the total weight of the monomer mixture, of a suspension agent, such as gelatin, starch, hydroxy-methyl cellulose, hydroxyethyl cellulose, hydroxypropyl cellulose, carboxymethyl cellulose, talc, clay, polyvinyl alcohol and the like. As a catalyst for the polymerization, one may use from about 0.05 to 5%, as based on the total weight of the monomer mixture, of a monomer soluble azo or peroxide catalyst such, for example, as azobisisobutyronitrile, lauroyl peroxide, benzoyl peroxide, isopropylperoxy dicarbonate, t-butyl peroxypivalate and the like.

Polymerization may ordinarily be initiated by heating the system to a temperature in the range of from about 20° to 150° C. for a period of from about 5 to 24 hours with agitation being applied throughout the course of the reaction. The resulting product will comprise an aqueous suspension of the copolymers which will be in the form of particulate solids having a resin solids content in the range of from about 5 to 60%, by weight. These copolymer particles will have a particle size in the range of from about 2 to 500 microns with a range of from about 20 to 250 microns being preferred when these copolymers are to be used as additives for preparing flame retardant thermoplastic polymers.

The following Examples further illustrate the invention:

EXAMPLE 1

A latex according to the present invention was prepared by mixing 558 grams of water, 1.5 grams of sodium lauryl sulfate and 2.0 grams of Triton X-200, a sodium sulfonate salt of an ethoxylated alkyl phenol anionic emulsifier sold by Rohm & Haas Co., Inc., in a 3-necked flask under nitrogen and heating the mixture to 80° C. Forty grams of a catalyst solution of ammonium persulfate (2% solution) was added. To the resulting solution was then added a monomer mixture comprising 60 grams of methyl methacrylate, 60 grams of bis(beta-chloroethyl) vinylphosphonate and 30 grams of methacrylic acid in a dropwise manner over a period of one hour while maintaining the temperature at 80° C. The reaction medium was then heated to 90° C. for 5 minutes with no refluxing acrylic monomer noted. The medium was cooled and an essentially gum free latex was filtered therefrom.

The latex was neutralized to a pH of 7-9 with dilute ammonium hydroxide and was cast into a film. The dried film exhibited an LOI of 26 using the test procedure described by Fenimore and Martin in the November, 1966 issue of *Modern Plastics*.

EXAMPLE 2

The procedure used in Example 1 was repeated but no methacrylic acid was used in the monomer mixture. The latex that was obtained contained about 20-30% unreacted oil which gas chromatographic analysis showed to be unreacted bis(beta-chloroethyl) vinylphosphonate.

EXAMPLE 3

Another latex was prepared as set forth in Example 1. The components added to the reaction mixture were:

| Component | Amounts (In Grams) |
| --- | --- |
| Water | 200 |
| Methylmethacrylate | 35 |
| Bis(beta-chloroethyl) vinylphosphonate | 35 |
| Methacrylic acid | 5 |
| Sodium lauryl sulfate | 0.8 |
| Triton X-200 | 1 |
| Ammonium persulfate (2% sol.) | 20 |
| Sodium meta bisulfite | 10 |

A stable latex was again obtained.

EXAMPLE 4

A water soluble copolymer was formed by adding the following components to an appropriate reaction vessel:

| Component | Amounts (In Grams) |
| --- | --- |
| Water | 200 |
| Bis(beta-chloroethyl) vinylphosphonate | 40 |
| vinyl chloride | 40 |
| Acrylic acid | 20 |
| Surfactant (10% Sipex UB) | 15 |
| Triton X-200 | 2.5 |
| Ammonium bisulfite (2% solution) | 70 |

This reaction mixture was heated at 50° C. for 5 hours with agitation (at 20 rpm) and had a 26% solids content. After neutralization with ammonium hydroxide to a pH of 7.0 a clear, water soluble system was produced. When added to water and applied as a surface coating, a hard flame resistant coating was produced.

The copolymers of this invention are useful as fire retardant additives for the types of thermoplastics listed in U.S. Pat. No. 3,726,839 to Jung I 1 Jin, and as coatings that have fire retardant properties.

What is claimed is:
1. A fire retardant, solid copolymer consisting of:
1. about 5 to 85% by weight of a bis(hydrocarbyl) vinylphosphonate having the formula:

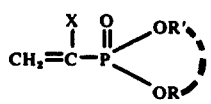

wherein X is selected from the group consisting of hydrogen, halogen, cyano, aryl, $C_1$–$C_{18}$ alkyl, alkenyl, cycloalkyl, cycloalkenyl, and

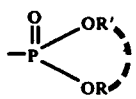

wherein R and R' are hydrocarbyl and hydrocarbyl groups with substituents which do not interfere with the polymerization of said vinylphosphonate, said hydrocarbyl groups and substituted hydrocarbyl groups either consisting of or consisting essentially of hydrogen and carbon and containing up to about 18 carbon atoms inclusive with the proviso that R and R' may be the same, different or conjoint;

2. about 10 to 85% by weight of a monomer selected from the group consisting of vinyl aryl compounds, and $C_{1-20}$ alkyl esters of acrylic and methacrylic acid, said monomer containing one ethylenically unsaturated bond and being copolymerizable with the vinylphosphonate; and
3. about 2 to 50% by weight of a monomer selected from the group consisting of acrylic and methacrylic acid.

2. A copolymer as claimed in claim 1 comprising from about 20–75% by weight of the vinylphosphonate.

3. A copolymer as claimed in claim 1 comprising from about 35–50% by weight of the vinylphosphonate.

4. A copolymer as claimed in claim 1 comprising from about 20–60% by weight of the ethylenically unsaturated compound.

5. A copolymer as claimed in claim 1 comprising from about 35–50% by weight of the ethylenically unsaturated compound.

6. A copolymer as claimed in claim 1 comprising from about 5–40% by weight acrylic or methacrylic acid.

7. A copolymer as claimed in claim 1 comprising from about 5–20% by weight of acrylic or methacrylic acid.

8. A copolymer as claimed in claim 1 wherein the vinylphosphonate is bis (beta-chloroethyl) vinylphosphonate.

9. A copolymer as claimed in claim 1 wherein the ethylenically unsaturated monomer is methyl methacrylate.

10. A copolymer as claimed in claim 1 comprising about 35–50% by weight of vinylphosphonate, about 35–50% by weight of the ethylenically unsaturated monomer, and from about 5–20% by weight of acrylic or methacrylic acid.

11. A copolymer as claimed in claim 10 wherein the ethylenically unsaturated monomer is a $C_1$–$C_{20}$ alkyl ester of acrylic or methacrylic acid.

* * * * *